(12) United States Patent
Padhye et al.

(10) Patent No.: US 7,689,376 B2
(45) Date of Patent: Mar. 30, 2010

(54) METHOD OF CALIBRATING AN ACTUATOR SYSTEM FOR A VARIABLE NOZZLE OF A TURBOCHARGER

(75) Inventors: Umesh V Padhye, Torrance, CA (US); Todd Ratke, Torrance, CA (US); Scott MacKenzie, San Pedro, CA (US)

(73) Assignee: Honeywell International Inc, Morristown, NJ (US)

( * ) Notice: Subject to any disclaimer, the term of this patent is extended or adjusted under 35 U.S.C. 154(b) by 30 days.

(21) Appl. No.: 12/129,343

(22) Filed: May 29, 2008

(65) Prior Publication Data

US 2009/0299673 A1 Dec. 3, 2009

(51) Int. Cl.
  *G06F 19/00* (2006.01)
  *F02B 7/00* (2006.01)
  *F02D 23/00* (2006.01)
(52) U.S. Cl. .......................... 702/100; 123/431; 60/602
(58) Field of Classification Search ................ 702/100; 73/861.74; 123/431; 60/297, 602
See application file for complete search history.

(56) References Cited

U.S. PATENT DOCUMENTS

| | | | |
|---|---|---|---|
| 3,893,300 A | * | 7/1975 | Connell ........................ 60/683 |
| 7,340,895 B2 | | 3/2008 | Noelle |
| 2007/0169746 A1 | * | 7/2007 | Irisawa ........................ 123/431 |
| 2007/0271942 A1 | * | 11/2007 | Yokoyama et al. ............ 62/278 |
| 2008/0011071 A1 | | 1/2008 | Figura |

* cited by examiner

Primary Examiner—Bryan Bui
(74) Attorney, Agent, or Firm—Alston & Bird

(57) ABSTRACT

A method for calibrating an actuator system for a turbocharger variable nozzle, the actuator system comprising an electronically controllable actuator coupled with a variable-geometry member of the nozzle and operable for causing movement thereof, and an electronic controller operable for controlling the actuator, the electronic controller having a memory for storing data. The method comprises (a) supplying a flow of fluid through the nozzle, (b) causing a continuous or stepwise movement of the actuator so as to move the variable-geometry member to cause a continuous or stepwise change in flow rate of the fluid through the nozzle, monitoring the changing flow rate, and recording at least two different points representing two different actuator positions and corresponding flow rates, and (c) storing in the memory of the electronic controller a multi-point calibration representing actuator position as a function of an input parameter designed to achieve a desired flow rate.

15 Claims, 2 Drawing Sheets

| Point # | Actuator Position | Flow Rate (kg/hr) |
|---|---|---|
| 1 | 30% | 550 |
| 2 | 80% | 280 |

METHOD OF CALIBRATING AN ACTUATOR SYSTEM FOR A VARIABLE NOZZLE OF A TURBOCHARGER

BACKGROUND OF THE INVENTION

The present disclosure is related generally to turbochargers having a variable nozzle for regulating flow into the turbine, wherein the position of a variable-geometry member of the nozzle is adjusted by an actuator in order to adjust the flow rate through the nozzle. The disclosure is related more particularly to a method for calibrating the actuator to improve the accuracy and repeatability with which the flow rate is set.

Turbochargers are used for boosting the performance of internal combustion engines, by compressing the air before it is supplied to the engine air intake, thereby increasing the air mass flow rate through the engine. In an exhaust gas-driven turbocharger, exhaust gas from the engine is passed through a turbine, which drives a centrifugal compressor for compressing the intake air. In many turbocharger systems, the turbine includes a variable nozzle having a variable-geometry member that is movable for regulating the effective flow area through the nozzle and hence the flow rate of the exhaust gas being delivered to the turbine. Various types of variable nozzles have been developed, including sliding pistons as well as vanes that are variable in setting angle. In most such variable nozzles, an external actuator is coupled with the variable-geometry member for causing movement thereof. The actuator is controlled in some fashion in order to adjust the variable-geometry member's position as needed for establishing the desired flow rate for a given engine operating condition.

Governmental regulations limiting the amount of emissions from internal combustion engines are growing increasingly stringent. One of the factors affecting emissions is the flow rate through the turbine of the turbocharger. Accordingly, it is desirable to be able to control the turbine flow rate with accuracy and repeatability. This, in turn, requires controlling the position of the variable-geometry member of the nozzle accurately and repeatably.

One of the difficulties encountered in controlling the nozzle flow rate is the inevitable variability in nozzle flow characteristics from one turbocharger to another. Even when two turbochargers are manufactured based on the same manufacturing specifications, they can have different nozzle flow characteristics because of manufacturing tolerances. As a result, if the actuator systems of the turbochargers are commanded to move to the same actuator positions, the resulting flow rates through the nozzles can differ, and sometimes the difference can be appreciable.

For these reasons, it is known to perform a calibration for each turbocharger/actuator pair in order to determine how to set the actuator to achieve a desired nozzle position. Such calibration can help to reduce at least some of the variability and thereby improve accuracy and repeatability of nozzle flow rate from one turbocharger to another.

BRIEF SUMMARY OF THE DISCLOSURE

The present disclosure concerns an improvement in the method used for calibrating an actuator system for a turbocharger variable nozzle. The actuator system comprises an electronically controllable actuator coupled with the variable-geometry member of the nozzle and operable for causing movement thereof, and an electronic controller operable for controlling the actuator, the electronic controller having a memory for storing data used by the controller. In accordance with one aspect of the disclosure, a calibration method comprises the steps of:

(a) supplying a flow of fluid through the nozzle;

(b) causing a continuous or stepwise movement of the actuator so as to move the variable-geometry member to cause a continuous or stepwise change in flow rate of the fluid through the nozzle, monitoring the changing flow rate, and recording at least two different points representing two different actuator positions and corresponding flow rates; and (c) storing in the memory of the electronic controller a multi-point calibration representing actuator position as a function of an input parameter designed to achieve a desired flow rate, the multi-point calibration comprising at least two points derived from the actuator positions and flow rates determined in step (b).

The input parameter, which would typically come from the engine control unit (ECU), can be in the form of a desired flow rate for the turbine. In that case, the multi-point calibration can represent a relationship between the desired flow rate and the actuator position needed in order to produce that flow rate. Alternatively, the input parameter can be a "nominal" actuator position required to produce a desired flow rate, assuming the nozzle behaves in accordance with a known "nominal" relationship between actuator position and flow rate. In that case, the multi-point calibration can represent a relationship between nominal actuator position and actual actuator position required to produce a given flow rate.

In one embodiment, step (b) comprises communicating a series of commanded actuator positions to the actuator to cause the actuator to incrementally move the variable-geometry member. The actuator positions recorded in step (b) are recorded as commanded actuator positions.

During step (b), it is preferred to continually monitor the pressure ratio across the turbine as the flow rate changes, and to adjust the turbine inlet pressure as needed to maintain the pressure ratio within a predetermined range.

The multi-point calibration can be stored in the memory of the controller in various forms. In one embodiment, the multi-point calibration is stored as a table of discrete points. For example, each point can comprise a value for flow rate and a corresponding value for the actuator position. Alternatively, each point can comprise a value for nominal actuator position and a corresponding value for actual actuator position. When the engine's control module sends an input signal for the turbocharger to produce a desired flow rate, the electronic controller of the actuator employs a table look-up scheme to determine the actuator position corresponding to the desired flow rate, based on the calibration table stored in the memory. The controller then commands the actuator to move to the determined position.

Alternatively, the multi-point calibration can be stored as a curve fit or formula. In the simplest case, the curve fit can be linear, based on only two points. The points preferably differ in actuator position by an amount greater than 40% of the maximum range for the actuator position.

The present disclosure also describes an actuator system for a variable-geometry member of a variable nozzle. The actuator system comprises an electronically controllable actuator and an electronic controller operable for controlling the actuator, the electronic controller having a memory for storing data used by the controller. The memory stores a multi-point calibration representing actuator position as a function of flow rate. The multi-point calibration comprises at least two points derived by flowing fluid through the variable nozzle while varying the actuator position and monitoring the flow rate so as to determine the actuator positions needed for establishing at least two different flow rates.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
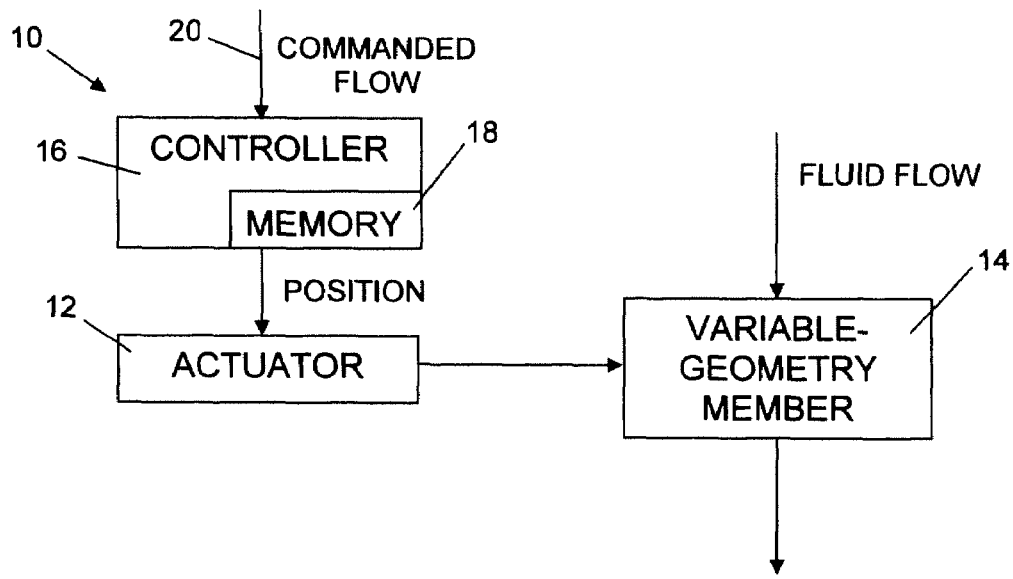
FIG. 1 is a schematic depiction of an actuator system for a variable nozzle of a turbocharger, in accordance with an embodiment of the invention.

FIG. 1 schematically depicts an actuator system 10 for a variable nozzle of a turbocharger. The actuator system includes an actuator 12 for being mechanically connected to a variable-geometry member 14 of the nozzle. In the case of a variable nozzle having pivoting vanes linked to a rotatable unison ring, the actuator 12 can be connected to the unison ring via a suitable linkage. In the case of a variable nozzle having a sliding piston, the actuator 12 can be connected to the piston via a suitable linkage. The details of the variable-geometry member and linkage are not important for purposes of the present invention. The actuator 12 can be of various types, including linear and rotary actuators. In one embodiment, the actuator comprises a rotary electric actuator (REA).

The actuator system also includes an electronic controller 16 for the actuator. The controller includes a memory 18 that can store electronic data for use by the controller. The controller is configured to be capable of executing operations by manipulating electronic signals. For example, the controller can include a microprocessor. Advantageously the controller is able to execute a predetermined set of instructions, or program, which can be implemented in firmware, in software, or in a combination of firmware and software. The electronic controller 16 can be incorporated in the actuator 12. Alternatively, the controller 16 can be implemented in an engine control unit (ECU) of the internal combustion engine to which the turbocharger is connected.

The controller 16 is typically arranged to receive command signals 20 determined in the ECU (not shown) of the internal combustion engine. In particular, the ECU typically supplies a signal 20 indicative of a commanded or desired flow rate for the turbine of the turbocharger. The controller 16 then signals the actuator to move to a position corresponding to the desired flow rate.

As noted above, turbochargers of the same nominal design typically vary in terms of nozzle flow characteristics. Accordingly, the relationship between actuator position and nozzle flow rate can differ appreciably from one turbocharger to the next. The present invention concerns a method for calibrating the actuator system in order to substantially reduce such variability.

Figure 2:
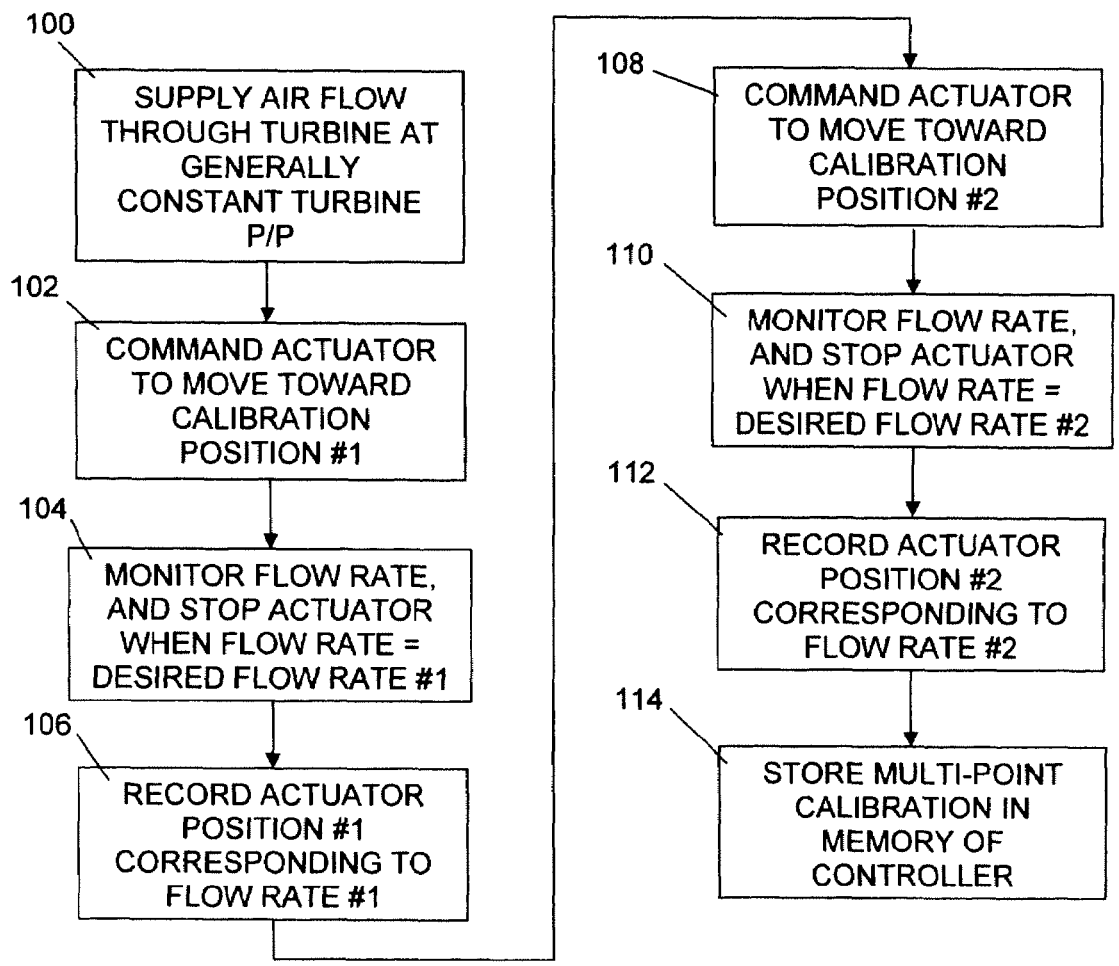
FIG. 2 is a flow chart illustrating a method for calibrating the actuator system in accordance with an embodiment of the invention.

FIG. 2 is a flow chart showing steps of the method in accordance with one embodiment of the invention. The calibration process can be performed with the aid of a flow bench or test stand having the capability of supplying a flow of air to the turbine at a selectively variable super-atmospheric pressure, and of measuring the flow rate of the air and the pressure ratio across the turbine. Such flow benches are well known and hence are not further described herein. As indicated at step 100 in FIG. 2, the flow bench is operated to supply air to the turbine. The flow bench monitors the pressure ratio across the turbine throughout the calibration process, and continually adjusts the turbine inlet pressure as needed in order to maintain the pressure ratio generally constant, i.e., within a predetermined range.

At step 102, the flow bench commands the actuator to move toward a first calibration position. For example, the first calibration position may correspond to an 80% closed position of the variable-geometry member of the turbine nozzle, which nominally is designed to produce a predetermined desired turbine flow rate. Advantageously the flow bench commands the actuator to move toward the first calibration position in a series of increments. As indicated in step 104, the flow bench monitors the changing flow rate as the variable-geometry member is incrementally moved. As the flow rate approaches the desired flow rate, the flow bench commands the actuator to move in smaller increments, until the measured flow rate is substantially equal to the desired flow rate. The commanded actuator position that substantially achieves the desired flow rate is recorded as actuator position #1 (step 106).

At step 108, the flow bench commands the actuator to move toward a second calibration position. For example, the second calibration position may correspond to a 30% closed position of the variable-geometry member of the turbine nozzle, which is nominally designed to produce a predetermined desired flow rate. As indicated in step 110, the flow bench monitors the changing flow rate as the variable-geometry member is incrementally moved. As the flow rate approaches the desired flow rate, the flow bench commands the actuator to move in smaller increments, until the measured flow rate is substantially equal to the desired flow rate. The commanded actuator position that substantially achieves the desired flow rate is recorded as actuator position #2 (step 112).

If desired, steps similar to steps 108-112 can be repeated for one or more additional actuator positions and flow rates. At a minimum, however, the method entails determining at least two actuator positions and corresponding flow rates as shown in FIG. 2.

The final step of the calibration method, shown at step 114, is storing a multi-point calibration in the memory 18 of the controller 16.

Figures 3, 4:
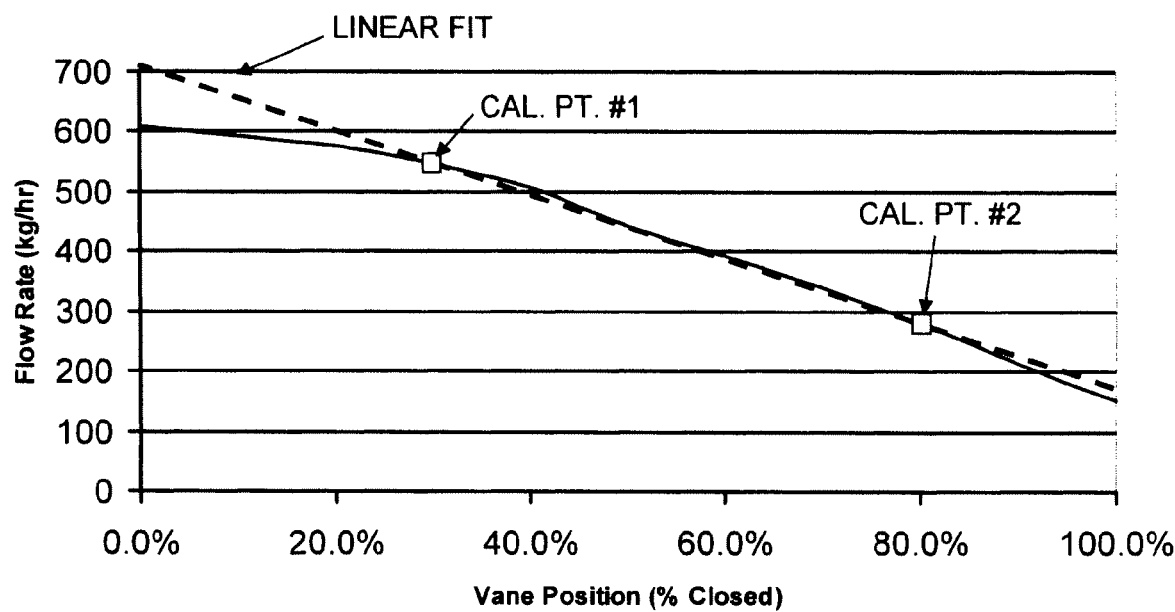
FIG. 3 is a plot depicting flow rate versus vane position data obtained by testing several turbochargers, and showing a linear two-point calibration based on the data.
FIG. 4 depicts a two-point calibration table that can be stored in the controller memory.

FIG. 3 is a graph showing actual test results obtained by testing a turbocharger on a flow bench generally as illustrated in FIG. 2. The turbocharger had a variable vane mechanism for regulating turbine flow rate. The turbine pressure ratio was maintained substantially constant at about 1.25 throughout the tests. The solid line represents actual flow rate versus percent vane position (0% representing fully open and 100% representing fully closed). It can be seen that the relationship between flow rate and vane position is substantially linear. Although the data below 30% vane position appear to indicate a somewhat non-linear trend, it is believed that this is a result of limitations of the particular flow bench used for the tests.

Other testing using different flow benches has indicated a substantially linear relationship all the way to 0% vane position.

In accordance with the invention, test data such as shown in FIG. 3 can be used to construct a multi-point calibration for the actuator system of the turbocharger. As an example, a two-point calibration can be determined as illustrated in FIG. 3. A first calibration point is selected at 30% vane position. The test data at 30% vane position indicate the flow rate was about 550 kg/hr. A second calibration point is selected at 80% vane position, at which the flow rate was about 280 kg/hr. These two points can be used to construct a two-point calibration representing a linear relationship between flow and vane position.

The two-point calibration can be stored in the controller's memory in any suitable form. As one example, a look-up table such as shown in FIG. 4 can be stored in the memory. The table includes two points each having a value for actuator position and a corresponding value for flow rate. The controller is programmed to employ a table look-up scheme to determine the actuator position required in order to produce a given flow rate. For instance, if the engine's ECU commands the controller to adjust the variable nozzle to produce a flow rate of 400 kg/hr, the controller employs linear interpolation between point #1 and point #2 to calculate the actuator position as about 57.8% vane position. The controller then sends to the actuator a command signal corresponding to 57.8% vane position.

A similar calibration can be performed for each turbocharger produced, such that each turbocharger's actuator system has its own multi-point calibration. In this manner, even if the turbochargers vary from one to the next in terms of nozzle flow characteristics, the turbochargers will produce substantially the same nozzle flow rate for a given commanded flow rate from the ECU.

The simple two-point calibration as described above works well when the nozzle flow rate is substantially linear with vane position. In reality, the flow rate generally is not perfectly linear with vane position. Improved accuracy can be attained by using more than two points for the calibration. For example, a look-up table having three, four, five, or more points can be stored in the controller's memory. The controller can employ a table look-up scheme to interpolate between the stored points.

As an alternative to the use of look-up tables, the controller's memory can store the multi-point calibration in the form of a curve fit or formula. For example, in the case of a two-point linear calibration, actuator position can be expressed in terms of flow rate using a linear formula such as Actuator Position=mx+b, where m is the slope of the line, x is the desired flow rate, and b is the y-axis intercept. In the case of a multi-point calibration based on three or more points, the formula can be a polynomial expression determined using known curve-fitting techniques.

The procedure described above assumes that the signal 20 (FIG. 1) from the engine's ECU represents a desired flow rate for the turbine. Alternatively, however, the signal 20 can represent a commanded actuator position that is based on a "nominal" relationship between actuator position and flow rate. In reality, a given turbocharger may have a position-flow relationship that differs from nominal. The multi-point calibration in this embodiment can represent a relationship between "nominal" actuator position and actual actuator position for a given flow rate.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for calibrating an actuator system for a turbocharger variable nozzle that directs fluid into a turbine of the turbocharger, the variable nozzle having a variable-geometry member that is movable for varying a flow rate through the nozzle, the actuator system comprising an electronically controllable actuator coupled with the variable-geometry member and operable for causing movement thereof, and an electronic controller operable for controlling the actuator, the electronic controller having a memory for storing data used by the electronic controller, the method comprising the steps of:
   (a) supplying a flow of fluid through the nozzle;
   (b) causing a continuous or stepwise movement of the actuator so as to move the variable-geometry member to cause a continuous or stepwise change in flow rate of the fluid through the nozzle, monitoring the changing flow rate, and recording at least two different points representing two different actuator positions and corresponding flow rates; and
   (c) storing in the memory of the electronic controller a multi-point calibration representing actuator position as a function of an input parameter designed to achieve a desired flow rate, the multi-point calibration comprising at least two points derived from the actuator positions and flow rates determined in step (b).

2. The method of claim 1, wherein step (b) comprises communicating a series of commanded actuator positions to the actuator to cause the actuator to incrementally move the variable-geometry member, and wherein the actuator positions recorded in step (b) are recorded as commanded actuator positions.

3. The method of claim 1, further comprising continually monitoring pressure ratio across the turbine as the flow rate changes during step (b), and adjusting turbine inlet pressure as needed to maintain the pressure ratio within a predetermined range.

4. The method of claim 1, wherein the multi-point calibration is stored as a table of discrete points.

5. The method of claim 1, wherein the multi-point calibration is stored as a curve fit.

6. The method of claim 5, wherein the curve fit is linear, based on only two points.

7. The method of claim 6, wherein the points differ in actuator position by an amount greater than 40% of the maximum range for the actuator position.

8. The method of claim 1, wherein the input parameter is a nominal actuator position that would achieve the desired flow rate if the turbocharger's variable nozzle behaved nominally, and wherein the multi-point calibration represents a relationship between the nominal actuator position and an actual actuator position required to produce the desired flow rate.

9. The method of claim 1, wherein the input parameter is the desired flow rate, and wherein the multi-point calibration represents a relationship between the desired flow rate and the actuator position.

10. An actuator system for a turbocharger variable nozzle that directs fluid into a turbine of the turbocharger, the variable nozzle having a variable-geometry member that is movable for varying a flow rate through the nozzle, the actuator system comprising:

an electronically controllable actuator structured and arranged to be coupled with the variable-geometry member and operable for causing movement thereof; and an electronic controller operable for controlling the actuator to adjust an actuator position thereof, the electronic controller having a memory for storing data used by the electronic controller, wherein the memory stores a multi-point calibration representing actuator position as a function of an input parameter designed to achieve a desired flow rate, the multi-point calibration comprising at least two points derived by flowing fluid through the variable nozzle while varying the actuator position and monitoring the flow rate so as to determine the actuator positions needed for establishing at least two different flow rates.

11. The actuator system of claim 10, wherein the multi-point calibration is stored in the memory as a table of discrete points.

12. The actuator system of claim 10, wherein the multi-point calibration is stored in the memory as a curve fit.

13. The actuator system of claim 12, wherein the curve fit is linear, based on only two points.

14. The actuator system of claim 13, wherein the points differ in actuator position by an amount greater than 40% of the maximum range for the actuator position.

15. The actuator system of claim 10, wherein the actuator comprises a rotary electric actuator.

* * * * *